Oct. 8, 1935.  P. R. ZINSER  2,016,567
FABRICATION OF COMPOSITION FIBER BOARD
Filed March 9, 1931
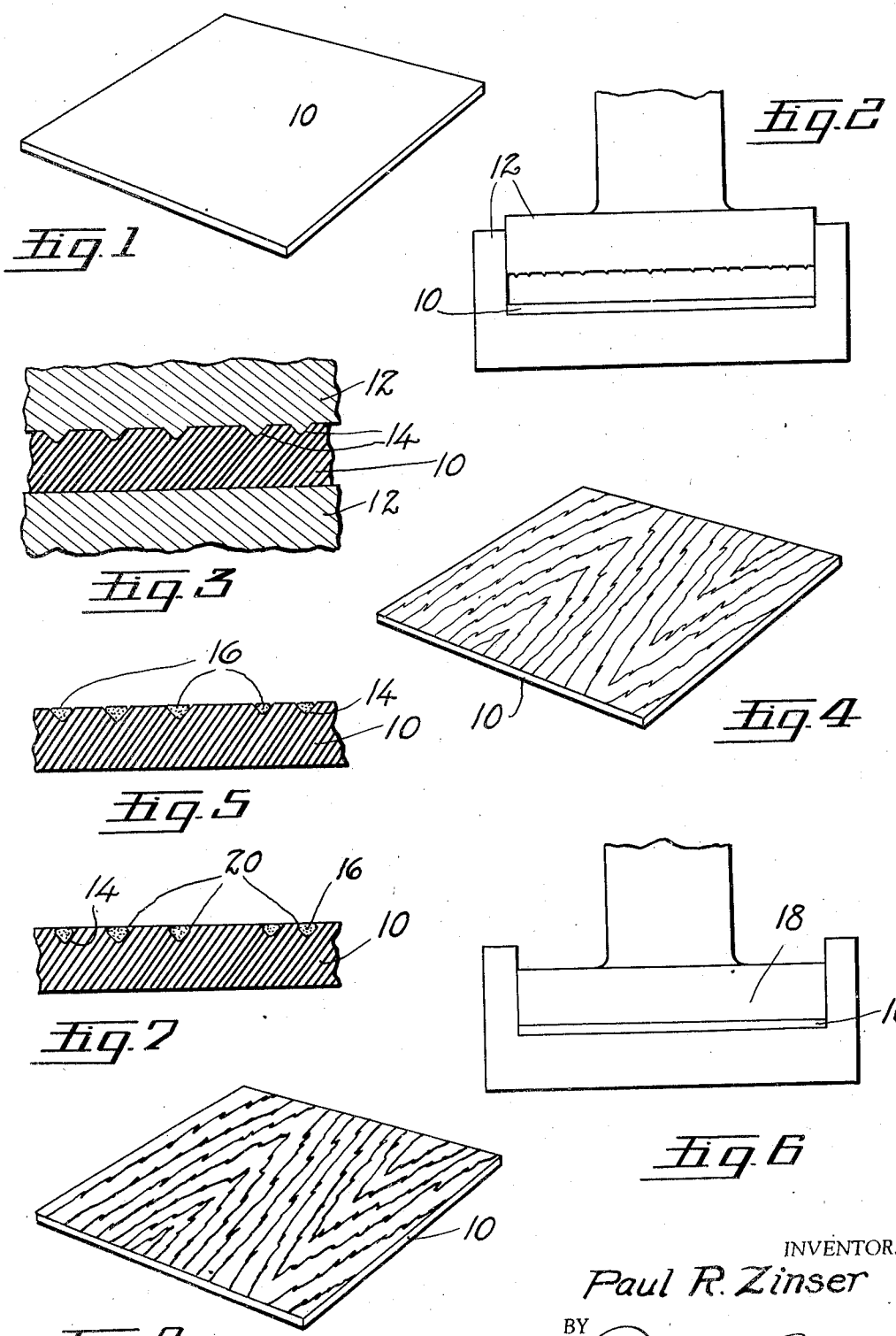
INVENTOR.
Paul R. Zinser
BY
Parker & Burton
ATTORNEYS.

Patented Oct. 8, 1935

2,016,567

UNITED STATES PATENT OFFICE 2,016,567

FABRICATION OF COMPOSITION FIBER BOARD

Paul R. Zinser, Detroit, Mich., assignor to Woodall Industries Incorporated, Detroit, Mich., a corporation of Michigan Application March 9, 1931, Serial No. 521,384

8 Claims. (Cl. 41—30)

This invention relates to improvements in the fabrication or treatment of composition fiber board or the like. Particularly, it relates to the re-production of a natural wood grain surface on such a board.

It is adaptable to other similar thermoplastic sheet material and is not to be limited to reproducing only natural wood grain surfaces but is adaptable for the reproduction of other similar decorative surfaces.

Primarily the invention relates to an improved method of producing an artificial wood grain surface on thermoplastic sheet material, such as thermoplastic composition fiber board, which is a substantially identic reproduction of a natural wood grain surface, and to the material product so produced. Suitable material for use with the improved process is composition fiber board carrying an asphaltum content (for example what is commercially known as KB board) and my improved process is particularly applicable thereto.

Heretofore natural wood grain has been imitated on flat surfaces commercially by means of what is commonly known as the transfer process. This process, while extensively used, is at best a palpable imitation and lacks true identity of appearance and invariably it is possible to recognize the product as an imitation, however well executed it may be.

This improved process product is superior to those hitherto known by reason of the fact that the actual physical characteristics of the wood which create the effect of the natural grain upon the eye of the observer are themselves reproduced within the material upon which the artificial wood grain is formed. In this way the reproduction is made so realistic that the observer can scarcely tell that the material is not a natural grain wood. An important characteristic of the improvement is that the cause itself rather than the effect is transferred to the thermoplastic sheet thereby creating directly the natural effect which produces the desired impression on the eye of the observer.

The composition fiber board here described as suitable for use in the carrying out of the process is a light durable product which possesses much the same strength and wearing qualities as natural wood but costs less. It is available in various types and certain of these types include composition fiber board carrying a substantial amount of asphaltum as a binder and waterproofing material. This asphaltum is ordinarily mixed with the cellulose fiber of which the board is formed during its manufacture. It is a relatively inexpensive material and the resulting product is quite cheap. A commercial embodiment is the KB board above mentioned. Some of these fiber boards, such as the one specifically referred to, possess thermo-plastic characteristics which render them adaptable for stamping or shaping under heat and pressure so that they can be bent into various forms. In addition they possess waterproofing characteristics which render them substantially impervious to the action of moisture which might otherwise tend to warp or distort them.

A primary object of this invention is the provision of an improved process by which natural wood grain may be reproduced upon thermoplastic sheet material in such a manner as to so precisely resemble the natural grain as to be substantially incapable of casual detection. It also comprises the product which results from such process and embodies the several steps hereinafter recited as pertinent thereto.

Another object of this invention is to not only provide a more realistic reproduction of natural wood grain upon composition fiber board having the characteristics described, but to do so by a stamping process whereby the board may be shaped and given the desired surface at one and the same time, which not only reduces the cost of production but also reproduces the grain accurately upon the surface regardless of the irregularity of contour of the sheet material.

Another object of the invention is to so treat fiber composition board having a substantial asphaltum content, or other waterproofing or binder content, that the latter will not ooze or "bleed" through the surface of the board as the result of the heat and pressure which accompanies the stamping operation, or because of the solvent action of finish materials which may subsequently be applied thereto.

An important feature of the process is the treatment of the natural wood, the surface grain of which it is desired to reproduce, to provide thereon an emphasized delineation of grain; and to provide therefrom a die to reproduce such exaggerated delineation of grain. The treatment of the wood, the surface of which is to be reproduced, and the forming of the die is an important consideration. Specifically this step is characterized by the formation of the reproducing die by electro-deposit of metal on the etched surface of the natural wood, and as subsidiary thereto the etching of the wood grain and the treatment of the wood to render it insensitive to the deleterious action of the acid in the electrolyte. The electrodeposition upon the etched wood and the preparation of the wood therefor is described and claimed in my copending application Serial No. 518,300, filed February 25, 1931.

Another important feature of the improved process is the reproduction on the thermoplastic sheet, by means of this die, of a facsimile of the etched surface of the natural wood, which serves as the foundation for the reproducing of the natural wood grain surface.

Other meritorious characteristics reside in the reproduction of such etched or emphasized grain on the thermoplastic sheet, the treatment of this die formed surface with a suitable color which collects to varying depths in the debossments on the surface, and the subjecting of such etched treated sheet to pressure which tends to compress and reduce this emphasized natural grain to substantially its natural normal dimension. Other objects, advantages, and meritorious features of my invention will more fully appear from the following description, appended claims, and accompanying drawing, wherein:

Figure 1 is a view of the artificial board prior to die stamping,

Figure 2 is a view of the artificial board being subjected to the pressure of a die, Figure 3 is a cross sectional detail view, exaggerated in size, of a portion of the artificial board showing the configurated formation produced in the surface of the board by the die, Figure 4 is a perspective view of the artificial board showing the condition of its surface after the die stamping operation, Figure 5 is a cross sectional detail view of a portion of the artificial board, exaggerated in size, showing the depressions therein filled with filler material, Figure 6 is a view of the board having its configurated surface subjected to the pressure of a flat faced die, Figure 7 is a cross sectional detail view, exaggerated in size, showing the condition of the configurated surface of the artificial board after its subjection to the pressure of the flat faced die, Figure 8 is a perspective view of the artificial board showing the same in finished condition.

The process here described is adaptable for the reproduction of any natural wood grain such as oak, walnut, mahogany, or the like. It is understood, however, that it is also applicable to the reproduction of other similar decorative surfaces, though wood graining is specifically referred to herein as the preferred illustrative embodiment. In carrying out this process, the natural wood, the surface grain of which it is desired to reproduce, is first subjected to a suitable etching operation to bring out more clearly and in emphasized form the natural wood grain. The natural wood is normally in the form of a board or plank and the smooth natural grain surface which it is desired to reproduce is sand blasted or rubbed with a wire brush so that the grain of the wood stands out in emphasized delineation. Natural wood grain is caused by varying densities of material and this etching treatment with a wire brush or by sand blasting serves, to bring out or exaggerate the natural wood grain appearance.

Following this etching of the wood it is immersed in fused wax, or some other suitable filler, such as boiling beeswax, which seals up the pores of the wood. The boiling wax penetrates into these pores and forms a barrier which prevents the acid of the electrolyte, wherein the board is later immersed, from eating into the wood. The board, after being submerged for that length of time necessary to fill the pores, is removed from the wax solution and again brushed or sand blasted to remove the excess coating of wax which has formed on its outer surface and which might fill up the crevices etched upon the surface.

After the wood has been thus treated it is then carbonized or sensitized. This may be accomplished with a metallic spray and is for the purpose of fixing the board to serve as an electric pole or electrode in an electroplating process to which it is to be subjected. The board is then immersed in an electrolyte solution such as a copper solution. Copper is deposited upon the board to the desired thickness and the tiny crevices and depressions which have been etched therein, and the ridges or embossments formed thereon, which delineate the natural wood grain will be precisely reproduced in minute detail upon the copper deposited plate. When a sufficient thickness of copper has been deposited to serve the purpose intended the board is removed from the bath and the electro-deposited copper, in the form of a sheet, is stripped from the board and mounted on a suitable backing or foundation plate to form a die. This treatment of the natural wood to form the die therefrom is an important step, and the formation of such a die is an important feature. This treatment is described in detail in my above mentioned application Serial No. 518,300.

The process is now described in connection with the drawing. It is understood that the drawing merely illustrates one embodiment of the method of shaping the artificial board, such as KB board.

The KB board 10, or other suitable thermoplastic sheet, is next prepared to receive the impression of this die. KB board carries a substantial quantity of an asphaltum compound which not only renders the board waterproof but imparts thereto thermo-plastic characteristics. However this asphalt compound has a tendency to ooze or "bleed" under the effect of heat and pressure, or certain solvents carried in finish materials such as are commonly applied to wood grain surfaces.

The board, therefore, is first treated with a priming coat which includes a vehicle that acts to form a barrier which will inhibit "bleeding" of the board, and which will also function to seal the asphalt so as to render it insensitive to the normal solvent action of subsequently applied finish materials. This vehicle therefore acts as a barrier in both directions.

An alcohol gum solution is suitable. More specifically a nitrocellulose ester may be dissolved in a solution of high alcohol content, or even a good shellac may be used. Shellac is less desirable, however, because of its tendency to crack when dry. In addition, this priming coat carries a pigment which forms the ground color of the natural wood surface it is desired to reproduce. While asphalt has been mentioned specifically as the waterproofing material or binder carried by the fiber board it is understood that the process is applicable to any suitable thermoplastic material, and that the priming coat serves to create the barrier as specified. This priming coat also must not dissolve readily under the action of the subsequently applied finish and lacquer coats, which as they frequently contain ingredients that would act to release the asphalt, must be kept away from it, and therefore the priming coat must itself be resistant thereto.

A flux material or antifriction substance, such as soapstone, is then rubbed over the surface of the board to prevent the board sticking to the die after the stamping operation. The thermoplastic sheet or board so treated is then placed in the stamping machine 12 and stamped with the provided die to reproduce the grain heretofore described. Figure 3 illustrates in detail the depressions 14 formed in the surface of the board as a result of the stamping operation. Figure 4 shows the characteristic natural wood grain effect imparted to the surface of the board. It will be apparent that any desired shape may be imparted to the board at the same time, thereby performing two operations at one and the same time. This not only reduces the cost but reproduces the grain accurately over a contoured surface.

The stamped board is then removed from the die and a paste filler 16 of a different and preferably a darker shade than the ground color is rubbed over the surface of the board. This filler collects in the crevices described to varying depths depending upon the crevices as indicated in Figure 5. The board is then subjected to a rubbing operation, the rubbing preferably being in a cross grain direction. This is for the purpose of bringing out most effectively the various lights and shades created by the varying densities, which correspond to the wood grain but are here made up of the minute crevices and debossments in the board carrying the pigment of varying depth.

As a final touch, the board may be provided with a transparent surface seal to produce a polished effect, after which it is subjected to a second rubbing process to again bring out the graining. If desired, the surface of the finished board may be sprayed to enhance the effects produced. This spray is not in any way essential and should not be done except where a particular effect, not to be found in the natural polished wood, is desired.

The board, following the die stamping operation, possesses a surface reproduction of the etched surface of the natural wood. This is an emphasized or exaggerated natural wood grain wherein the crevices and debossments are of substantially greater dimension than is the case in a natural wood grain. In reproducing certain wood grains, such as antique weathered oak, this may be satisfactory but in the reproducing of close textured wood, such as walnut or mahogany, it has been found desirable to subject the finished thermoplastic sheet to a pressure forming operation which compresses and compacts or reduces the elevations on the die formed surface of the board. This pressure may preferably be applied by a highly polished chrome steel plate 18 (Fig. 6) and under the effect of this pressure the surface is formed to represent the natural grain of the wood prior to its etching out as hereinbefore described. This smooth pressure plate operation follows the application of the filler pigment and serves another highly important function. It tends, in its compression and reduction of the ridges and embossments on the surface of the board, to cause said ridges to spread over the pigment filler which has been collected in the crevices or debossments interlocking or inlaying the same in position in the board. This is illustrated in Figure 7 where the top portions 20 of the elevations are shown overlying the filler 16.

It will therefore be seen that the complete panel will comprise the foundation board provided with the priming coat and having an embossed-debossed surface, the debossments in which have collected coloring material of varying depth and area which are in part inlaid therein, in that the ridges adjacent the crevices are spread partly thereover; and is provided over all with a uniform thickness transparent finish coat. The panel in completed form is illustrated in Figure 8.

I claim:
1. That method of producing a sheet of thermoplastic material having configurations in its surface which includes forming on the surface of said sheet elevations and depressions, filling the depressions with suitable filler material, and stamping this surface with a smooth plate compressing and spreading the elevations to partly overlie the filler material.

2. That method of producing configurations on the surface of a sheet of thermoplastic material which includes treating the thermoplastic sheet with a priming coat carrying a pigment to give a ground color to the surface of the sheet, subjecting the sheet to a die stamping operation which forms elevations and depressions in the surface of the sheet, applying a suitable finish color material to the die formed surface of the sheet to collect in the die formed depressions of said surface, and subjecting said finished die formed surface to pressure to compress and reduce the elevations formed on the surface by said die and to inlay the color material within the sheet.

3. That method of producing configurations upon a thermoplastic sheet of composition fiber board carrying an asphaltum content which includes treating the surface of said thermoplastic sheet with a priming coat including a vehicle inhibitory to bleeding of the asphalt, stamping the treated surface of the fiber board with a die having a configurated working face, applying a suitable filler material to said die formed surface to collect in the die formed depressions on the surface of the board, and subjecting said die formed surface to the pressure of a flat plate to reduce and compress the die formed configurations thereon and to cause the board structure to partly overlay the filler material in the depressions of the board.

4. That method of reproducing natural wood grain upon a thermoplastic sheet which includes subjecting the sheet to a die stamping operation under heat to form minute projections and depressions on the surface of the sheet in imitation of natural wood grain, applying color filler material to the die formed surface of the sheet to collect in the die formed depressions of said surface, subjecting the die formed surface to a rubbing operation in cross grain direction to effectively shade the varying densities of the filler material in the depressions, and subjecting said die formed surface to a uniform pressure to compress and spread the minute projections thereon partly over the filler material in the depressions locking the latter therewithin.

5. That method of reproducing natural wood grain upon a thermoplastic sheet of composition fiber board which includes subjecting said sheet to a die stamping operation to form on the surface thereof minute elevations and depressions in imitation of but of a larger size than natural wood grain, applying suitable color material to said surface to collect in the depressions thereof, and subjecting said surface to pressure to reduce the height of said elevations and cause the same to partly overlie the color material in the depressions whereby the die formed surface assumes the size and appearance of natural size wood grain.

6. That method of reproducing natural wood grain upon a thermoplastic sheet of composition fiber board which includes subjecting said sheet to a die stamping operation to form on the surface thereof coarse grain configurations in imitation of natural wood grain, applying suitable color material to said surface to collect in the crevices of said die formed grained surface, and then subjecting said surface to pressure to compress the coarse grain configurations and to cause the board structure to overlay the filler material in the crevices to simulate a finer grain configuration on the surface of the board.

7. That method of reproducing, by die stamping, an indented wood grain surface upon a thermoplastic sheet material which includes applying to said surface a coating containing a pigment to give a ground color of natural wood to the surface of said sheet, subjecting the surface of said sheet to a die stamping operation to impress into said surface a natural wood grain configuration, applying coloring material of a darker shade than said ground color to the indentations in said surface to simulate the grain texture of wood, and further subjecting the surface of said sheet to a uniform pressure to cause the surface material of the sheet to spread and partly overlie the filler material in said indentations.

8. An artificial board simulating the natural grain condition of wood comprising a panel of thermoplastic material having minute elevations and depressions assuming the appearance of natural wood grain, a priming coat on the configurated surface of said panel carrying a pigment to give a ground color of natural wood to the surface, filler material of a darker shade than said ground color collected in said depressions to simulate the grain texture of natural wood, said surface being spread to partially overlie the filler material in the depression and lock the same therein, and a transparent finish coat extending over said surface to seal the surface materials thereunder.

PAUL R. ZINSER.